United States Patent
Wang

(10) Patent No.: US 12,275,645 B2
(45) Date of Patent: Apr. 15, 2025

(54) METHOD FOR PREPARING LITHIUM CARBONATE FROM LITHIUM SULFATE

(71) Applicant: PUKYONG NATIONAL UNIVERSITY INDUSTRY-UNIVERSITY COOPERATION FOUNDATION, Busan (KR)

(72) Inventor: Jei Pil Wang, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 516 days.

(21) Appl. No.: 17/603,278

(22) PCT Filed: Sep. 5, 2019

(86) PCT No.: PCT/KR2019/011468
§ 371 (c)(1),
(2) Date: Oct. 12, 2021

(87) PCT Pub. No.: WO2021/040114
PCT Pub. Date: Mar. 4, 2021

(65) Prior Publication Data
US 2022/0185687 A1  Jun. 16, 2022

(30) Foreign Application Priority Data
Aug. 23, 2019  (KR) .................. 10-2019-0103741

(51) Int. Cl.
*C01D 15/08* (2006.01)

(52) U.S. Cl.
CPC .......... *C01D 15/08* (2013.01); *C01P 2006/82* (2013.01)

(58) Field of Classification Search
CPC ...................................................... C01D 15/08
See application file for complete search history.

(56) References Cited

U.S. PATENT DOCUMENTS

2019/0144294 A1* 5/2019 Song .................. C01D 7/26
423/179.5

FOREIGN PATENT DOCUMENTS

| JP | 2009046390 | 3/2009 |
| JP | 2013001990 | 1/2013 |
| KR | 20110062307 | 6/2011 |
| KR | 20120060619 | 6/2012 |
| KR | 101973483 | 4/2019 |

OTHER PUBLICATIONS

Anwar Ul Haq, Rana. Thermodynamics and precipitation kinetics of lithium carbonate (Li2CO3). MS thesis. 2019 (Year: 2019).*
International Search Report and Written Opinion issued in Corresponding Korean Application No. PCT/KR2019/011468, dated May 22, 2020.

* cited by examiner

*Primary Examiner* — Ian A Rummel
*Assistant Examiner* — Eric Scott Sherman
(74) *Attorney, Agent, or Firm* — NORTON ROSE FULBRIGHT US LLP

(57) ABSTRACT

The present invention relates to a method for producing lithium carbonate by mixing lithium sulfate with a carbon material and heat-treating same in a carbon dioxide or carbon monoxide atmosphere.

7 Claims, 7 Drawing Sheets

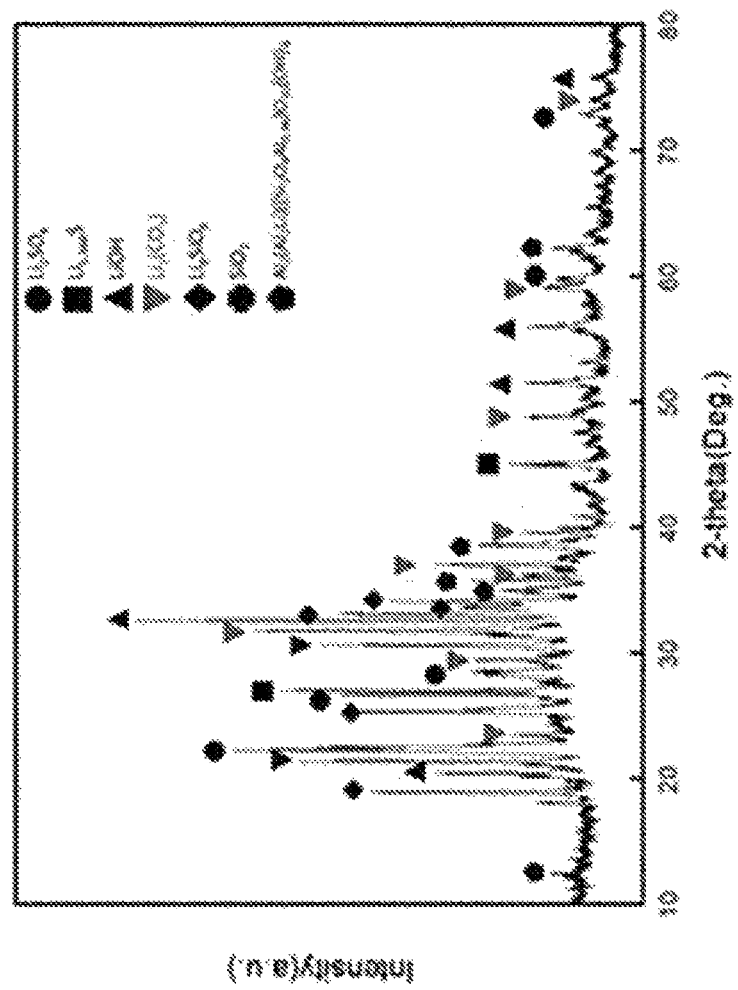
FIG. 4
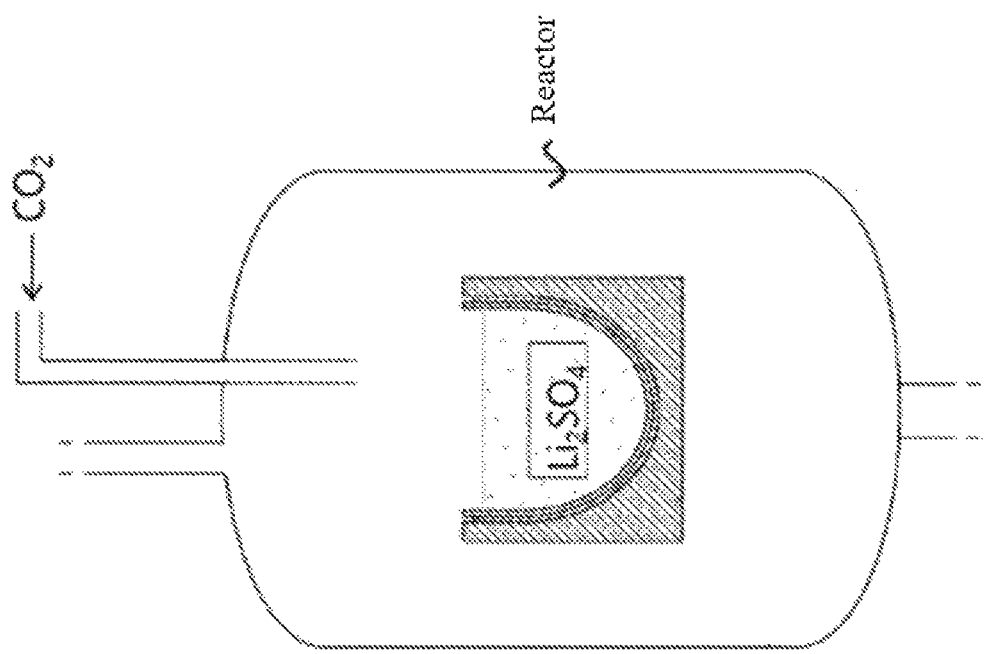

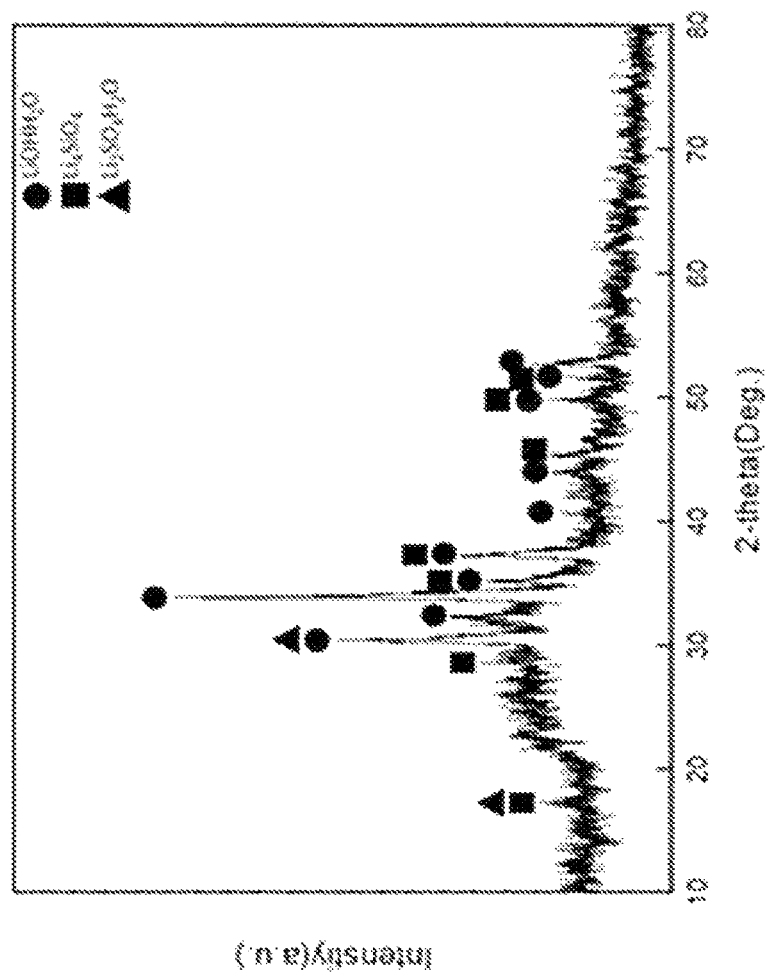
FIG. 6
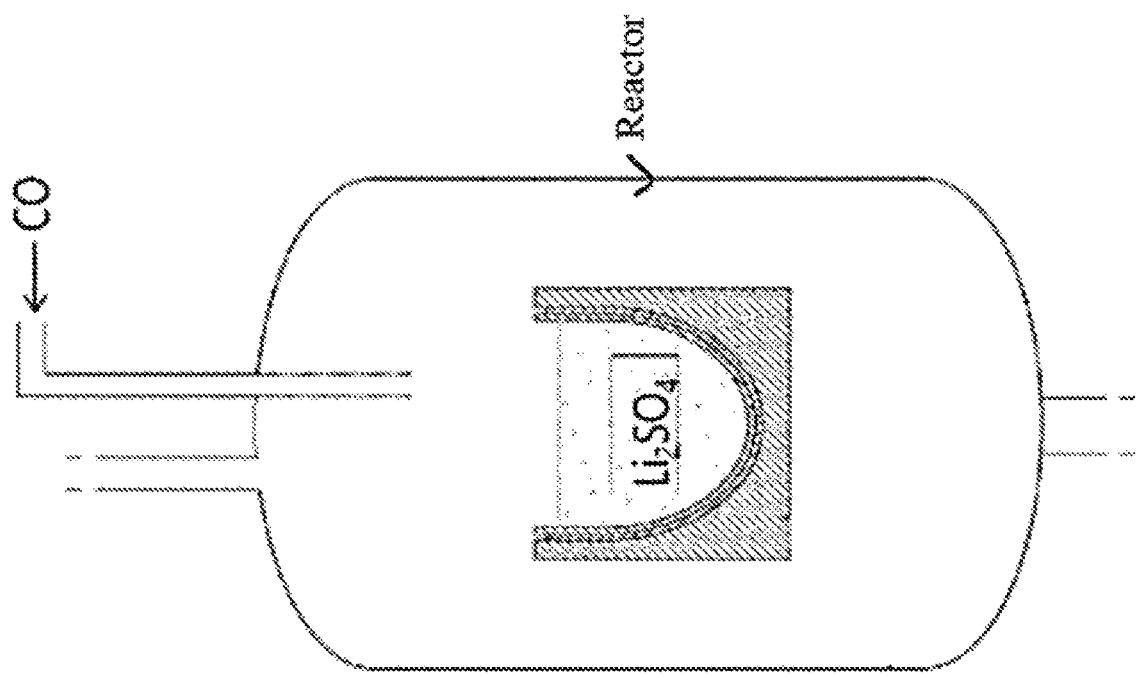

METHOD FOR PREPARING LITHIUM CARBONATE FROM LITHIUM SULFATE

BACKGROUND

Field of the Disclosure

The present disclosure relates to a method for producing lithium carbonate from lithium sulfate.

Description of Related Art

Lithium is an element belonging to alkali metals and has a low reduction potential, and thus may be used as a positive electrode for lithium primary and secondary batteries. Lithium is used as a reducing agent, an alloy additive, and a nuclear fusion raw material throughout industries.

Lithium is the most widely used in the lithium battery field and is a rare metal that is entirely dependent on imports from foreign countries.

Most of lithium raw materials produced in Korea are extracted from seawater. Research on recovery and production of lithium carbonate, lithium phosphate, and lithium hydroxide from waste batteries and lithium ore is ongoing.

However, a method for preparation of lithium carbonate from lithium sulfate ($Li_2SO_4$) includes a liquid reduction method, a wet method, etc. However, a scheme for lithium carbonate preparation using a simple dry thermal reaction has not been performed.

In a conventional lithium recovery scheme, a process of obtaining lithium carbonate by evaporating water from brine containing lithium and adding sodium carbonate thereto is common. That is, lithium is concentrated until a lithium content in the brine exceeds 0.5%. Then, lithium carbonate which is not soluble in water is extracted. This method uses seawater as a nearly infinite resource, so that there is no problem of resource depletion. However, the method takes a long time because the method goes through a process of evaporating water and adding sodium carbonate thereto. The lithium concentration in seawater is low, so that a large amount of treatment equipment is essential.

SUMMARY OF THE INVENTION a purpose of the present disclosure is to provide a method for producing lithium carbonate powders from lithium sulfate using a simple dry thermal reaction process.

A first aspect of the present disclosure provides a method for producing lithium carbonate from lithium sulfate, the method including heat-treating a mixture of lithium sulfate and carbon material under a carbon dioxide or carbon monoxide atmosphere.

In one embodiment of the first aspect, the heat-treatment is conducted under the carbon dioxide atmosphere.

In one embodiment of the first aspect, the heat-treatment is carried out under a dry condition.

In one embodiment of the first aspect, the carbon material includes at least one selected from carbon powders, graphene, graphite, activated carbon and carbon black.

In one embodiment of the first aspect, the heat-treatment is carried out at a temperature in a range of 800 to 1000° C.

In one embodiment of the first aspect, a concentration of carbon dioxide or carbon monoxide in the carbon dioxide or carbon monoxide atmosphere is maintained by injecting the carbon dioxide or carbon monoxide while the heat-treatment is being conducted.

In one embodiment of the first aspect, the carbon material is mixed with the lithium sulfate in a molar ratio of 1 or greater with respect to 1 mol of the lithium sulfate.

In one embodiment of the first aspect, the lithium sulfate is heat-treated in a range of 800 to 1000° C. under the carbon dioxide atmosphere of a dry condition.

A second aspect of the present disclosure provides a method for producing lithium carbonate from lithium sulfate, the method including heat-treating lithium sulfate under a carbon dioxide atmosphere.

In one embodiment of the second aspect, the heat-treatment is carried out under a dry condition. In one embodiment of the second aspect, the heat-treatment is carried out at a temperature in a range of 800 to 1000° C.

In one embodiment of the second aspect, a concentration of carbon dioxide in the carbon dioxide atmosphere is maintained by injecting the carbon dioxide while the heat-treatment is being conducted.

In one embodiment of the second aspect, the lithium sulfate is heat-treated in a range of 800 to 900° C. under the carbon dioxide atmosphere of a dry condition.

According to the present disclosure, a method for producing lithium carbonate powders from lithium sulfate using a simple dry heat-treatment process is provided.

According to the present disclosure, because the method does not use substances harmful to the environment, there is no cost for waste disposal, so that the method may be environmentally friendly and may reduce a production cost. Further, according to the present disclosure, the method uses the simple dry heat treatment process, such that commercialization thereof is relatively easy, and equipment and process costs may be reduced.

BRIEF DESCRIPTION OF THE DRAWINGS

FIG. 4 is a schematic diagram and a XRD result of a reaction occurring when carbon dioxide is injected into a reactor containing lithium sulfate.

FIG. 6 is a schematic diagram and a XRD result of a reaction occurring when carbon monoxide is injected into a reactor containing lithium sulfate.

DETAILED DESCRIPTION OF THE INVENTION

Figure 1:
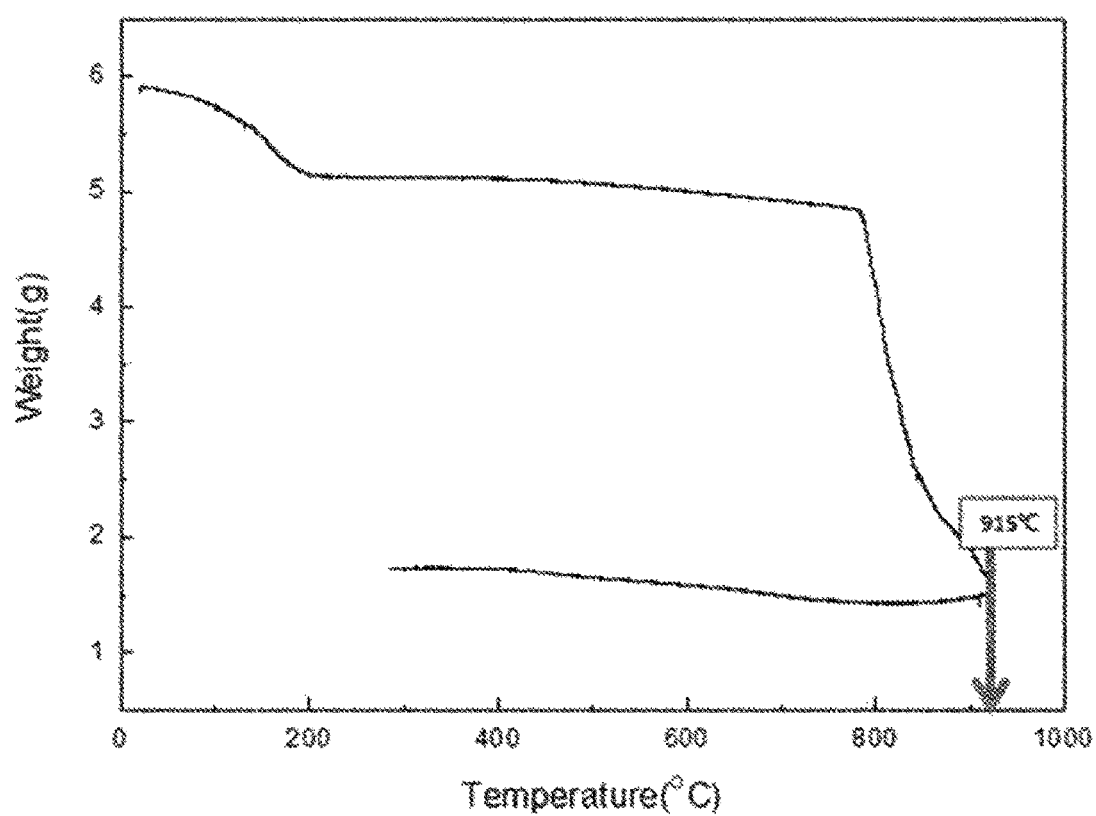
FIG. 1 shows a result of thermogravimetric analysis showing a temperature at which change from lithium sulfate to lithium carbonate occurs.

Hereinafter, an embodiment of the present disclosure will be described in detail with reference to the accompanying drawings. The present disclosure may be variously modified and may take many forms. Thus, specific embodiments will be illustrated in the drawings and described in detail herein.

However, the specific embodiments are not intended to limit the present disclosure thereto. It should be understood that all changes, equivalents thereto, or substitutes therewith are included in a scope and spirit of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or greater other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure relates to a method for producing lithium carbonate ($Li_2CO_3$) from lithium sulfate ($Li_2SO_4$). The method includes mixing lithium sulfate with a carbon material to produce a mixture, and injecting carbon dioxide or carbon monoxide into a reactor containing the mixture and performing heat-treatment of the mixture, or injecting carbon dioxide into a reactor containing lithium sulfate, thereby producing lithium carbonate from lithium sulfate.

The lithium sulfate may be obtained by treating lithium with sulfuric acid. The lithium may be waste lithium. When an article containing lithium is discarded, treatment of the article with sulfuric acid creates a lithium sulfate precipitate. Then, lithium sulfate may be obtained therefrom. The lithium sulfate may not be limited thereto and may be obtained by various methods.

The heat-treatment may be performed under a dry condition. The drying condition may mean that there is no moisture. Accordingly, in a process of producing lithium carbonate from lithium sulfate, an intermediate product or by-product including water is not produced.

The method continuously injects carbon dioxide or carbon monoxide into a reaction vessel while lithium sulfate and carbon material react with each other. Thus, a concentration of carbon dioxide or carbon monoxide is kept at a constant level to maintain an atmosphere.

The carbon material and the injected carbon dioxide or carbon monoxide may react with the lithium sulfate via heat-treatment to produce lithium carbonate. The carbon material may a material including carbon such as carbon powders, graphene, graphite, activated carbon, and carbon black. The carbon material may be mixed with the lithium sulfate in a molar ratio of 1 or greater with respect to 1 mol of the lithium sulfate.

In the carbon dioxide atmosphere, the carbon dioxide together with the carbon material may react with the lithium sulfate to produce lithium carbonate. Further, in the carbon dioxide atmosphere, the carbon dioxide may react with lithium sulfate while the carbon material is absent, thereby producing lithium carbonate. When the carbon dioxide together with the carbon material reacts with the lithium sulfate, an entirety of the lithium sulfate may be converted to lithium carbonate, and thus, by-products may not be produced.

The heat-treatment may be performed in a range of about 800 to 1000° C. in the reactor.

EXAMPLES

Example 1

In this example, carbon dioxide and carbon powders reacted with lithium sulfate via heat-treatment. The carbon powders were used as one example of the carbon material.

To determine a temperature at which lithium sulfate is converted to lithium carbonate, a temperature at which lithium sulfate reacts with carbon dioxide and carbon powders and thus is converted to lithium carbonate was measured while changing the heat-treatment temperature. FIG. 1 shows a temperature at which the conversion occurs as measured with a thermogravimetric analyzer. As may be identified from a graph of FIG. 1, a phase transition was observed around 900° C. Therefore, in each of Examples, the heat-treatment was conducted at 900° C.

Figure 2:
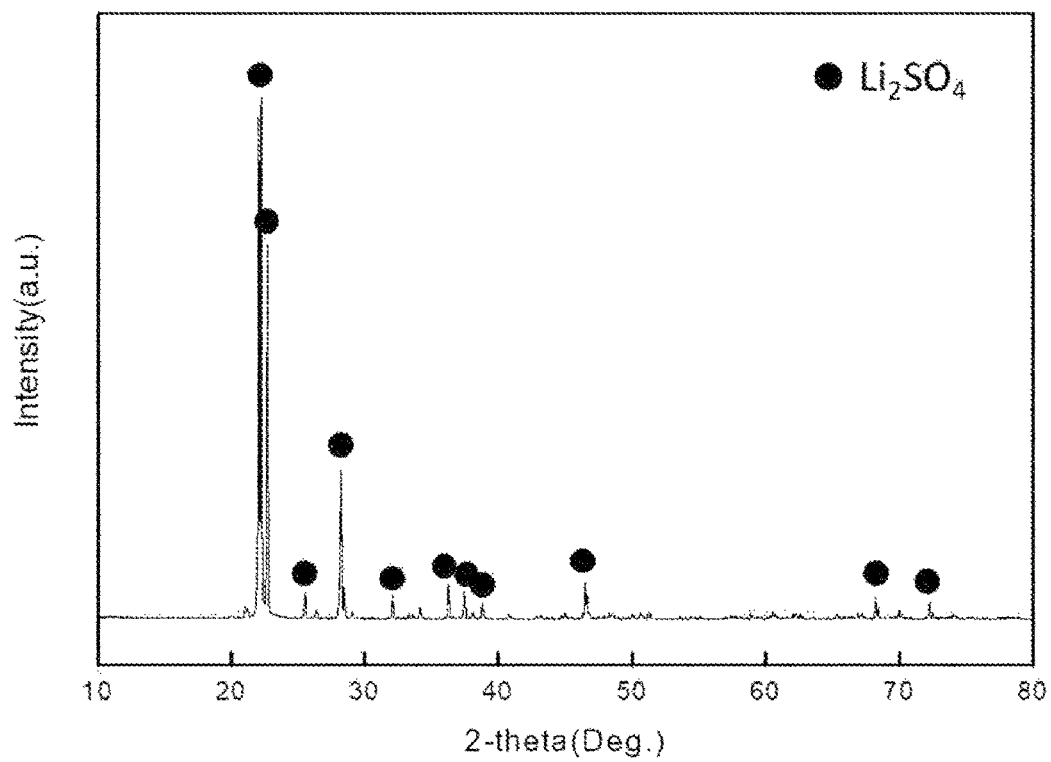
FIG. 2 is a XRD result of a lithium sulfate raw material.

FIG. 2 is an XRD result of pure lithium sulfate for comparison with an experimental result of each of examples.

Figure 3:
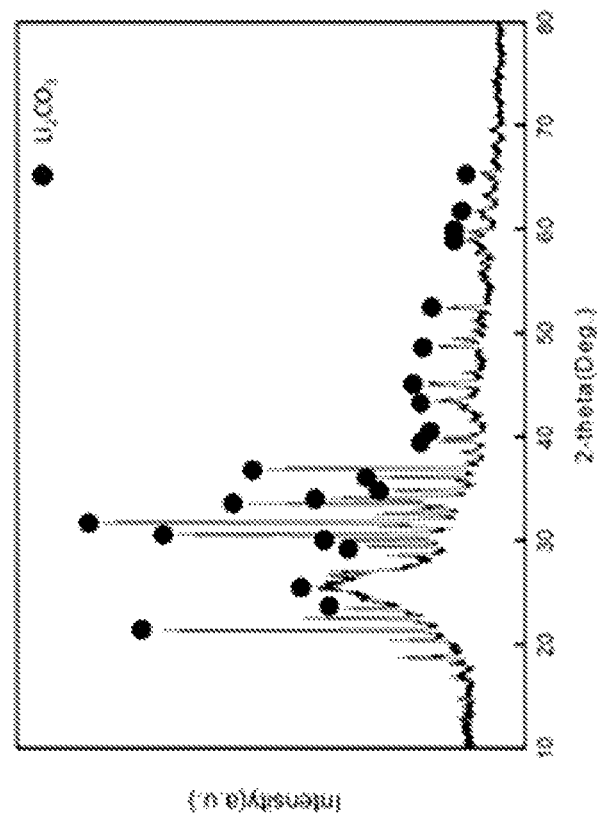
FIG. 3 is a schematic diagram and a XRD result of a reaction occurring when carbon dioxide is injected into a reactor containing a mixture of lithium sulfate and carbon powders and at the same time, the mixture is subjected to heat treatment.
Figure 3:
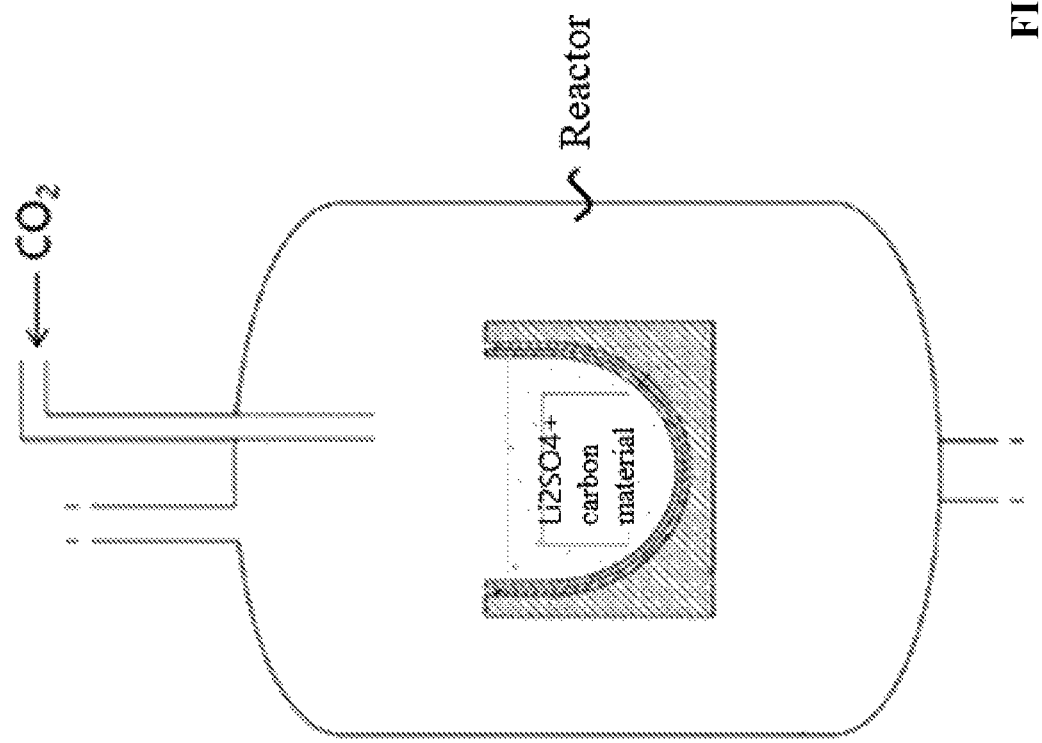

In this example, lithium sulfate and carbon powders were mixed with each other in a molar ratio of 1:1. While carbon dioxide gas was injected into the reactor at 300 cc/min, the heat-treatment was conducted at 900° C. for 3 hours. FIG. 3 is a schematic diagram and a XRD result of a reaction occurring when carbon dioxide is injected into a reactor containing a mixture of lithium sulfate and carbon powders and at the same time, the mixture is subjected to heat treatment.

As may be identified in FIG. 3, no peaks of compounds other than lithium carbonate were found in the experimental result. Further, it may be identified that a peak of lithium carbonate appears very stably.

Example 2

In this example, carbon dioxide reacted with lithium sulfate via heat-treatment while the carbon material was absent.

In this example, lithium sulfate was heat-treated in the reactor at 900° C. for 3 hours while carbon dioxide gas was injected to the reactor at 300 cc/min. FIG. 4 is a schematic diagram and a XRD result of a reaction occurring when carbon dioxide is injected into a reactor containing lithium sulfate.

It may be identified in FIG. 4 that peaks of other byproducts occur, but the lithium carbonate (inverted triangle) is produced in a significant amount.

Example 3

In this example, carbon monoxide and carbon powders reacted with lithium sulfate via heat-treatment.

Figure 5:
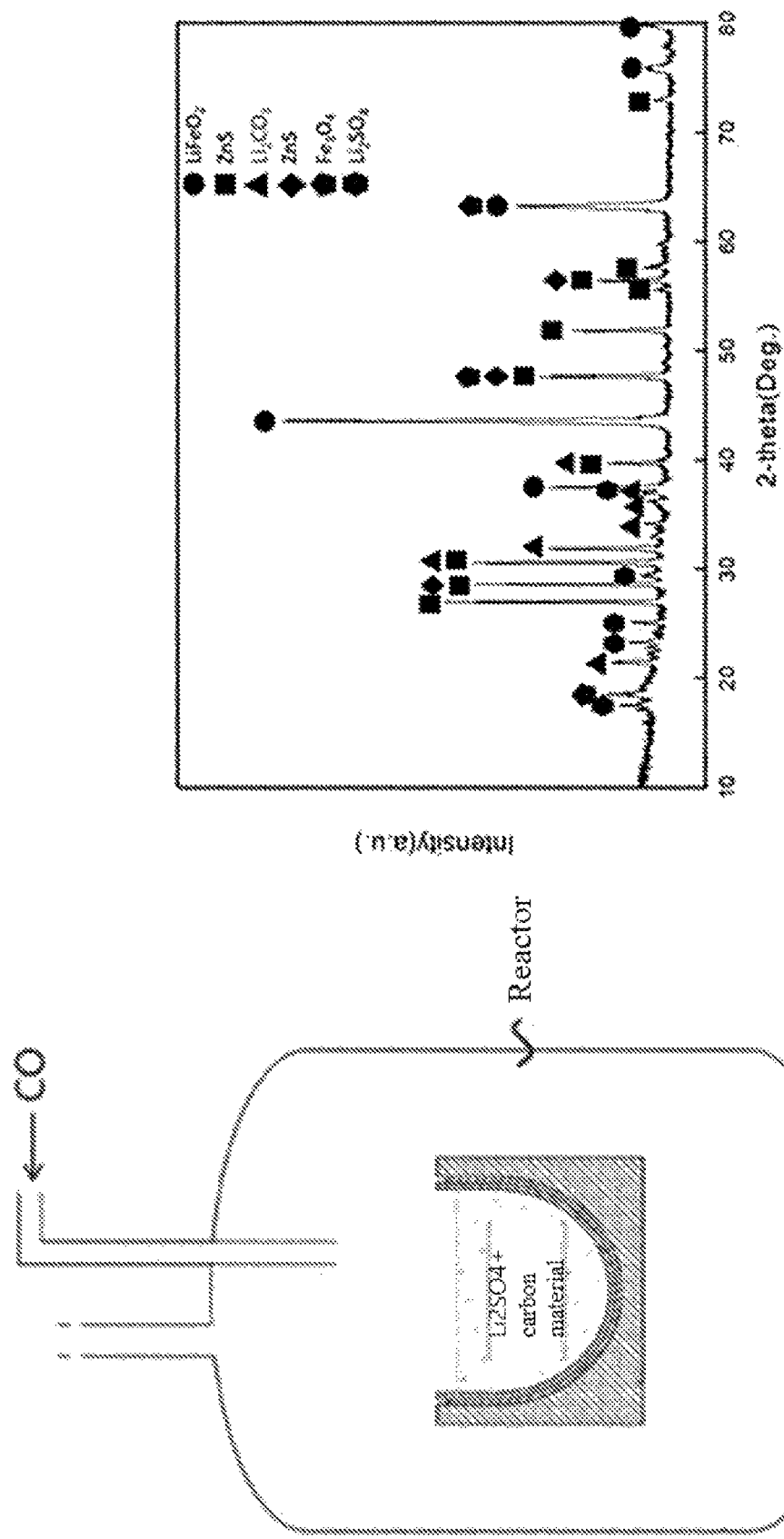
FIG. 5 is a schematic diagram and a XRD result of a reaction occurring when carbon monoxide is injected into a reactor containing a mixture of lithium sulfate and carbon powders and at the same time, the mixture is subjected to heat treatment.

In this example, lithium sulfate and carbon powders were mixed with each other in a molar ratio of 1:1. While carbon monoxide gas was injected to the reactor at 300 cc/min, heat-treatment was conducted at 900° C. for 3 hours. FIG. 5 is a schematic diagram and a XRD result of a reaction occurring when carbon monoxide is injected into a reactor containing a mixture of lithium sulfate and carbon powders and at the same time, the mixture is subjected to heat treatment.

It may be identified in FIG. 5 that peaks of other byproducts occur, but lithium carbonate (triangle) is produced.

Example 4

In this example, carbon monoxide reacted with lithium sulfate via heat-treatment while the carbon material was absent.

In this example, lithium sulfate was heat-treated in the reactor at 900° C. for 3 hours while carbon monoxide gas was injected to the reactor at 300 cc/min. FIG. 6 is a schematic diagram and a XRD result of a reaction occurring when carbon monoxide is injected into a reactor containing lithium sulfate.

Unlike Example 2 (in which lithium sulfate and carbon dioxide reacted with each other via heat-treatment), the peak of lithium carbonate was not identified in the heat treatment under the carbon monoxide atmosphere while the carbon material was not present. Therefore, it may be identified that the carbon material is essential to produce lithium carbonate from lithium sulfate under the carbon monoxide atmosphere.

Example 5

In this example, the carbon material reacts with oxygen in air to produce carbon dioxide or carbon monoxide. Then, whether the carbon dioxide or carbon monoxide as produced and the carbon material allow lithium sulfate to be converted to lithium carbonate is examined.

Figure 7:
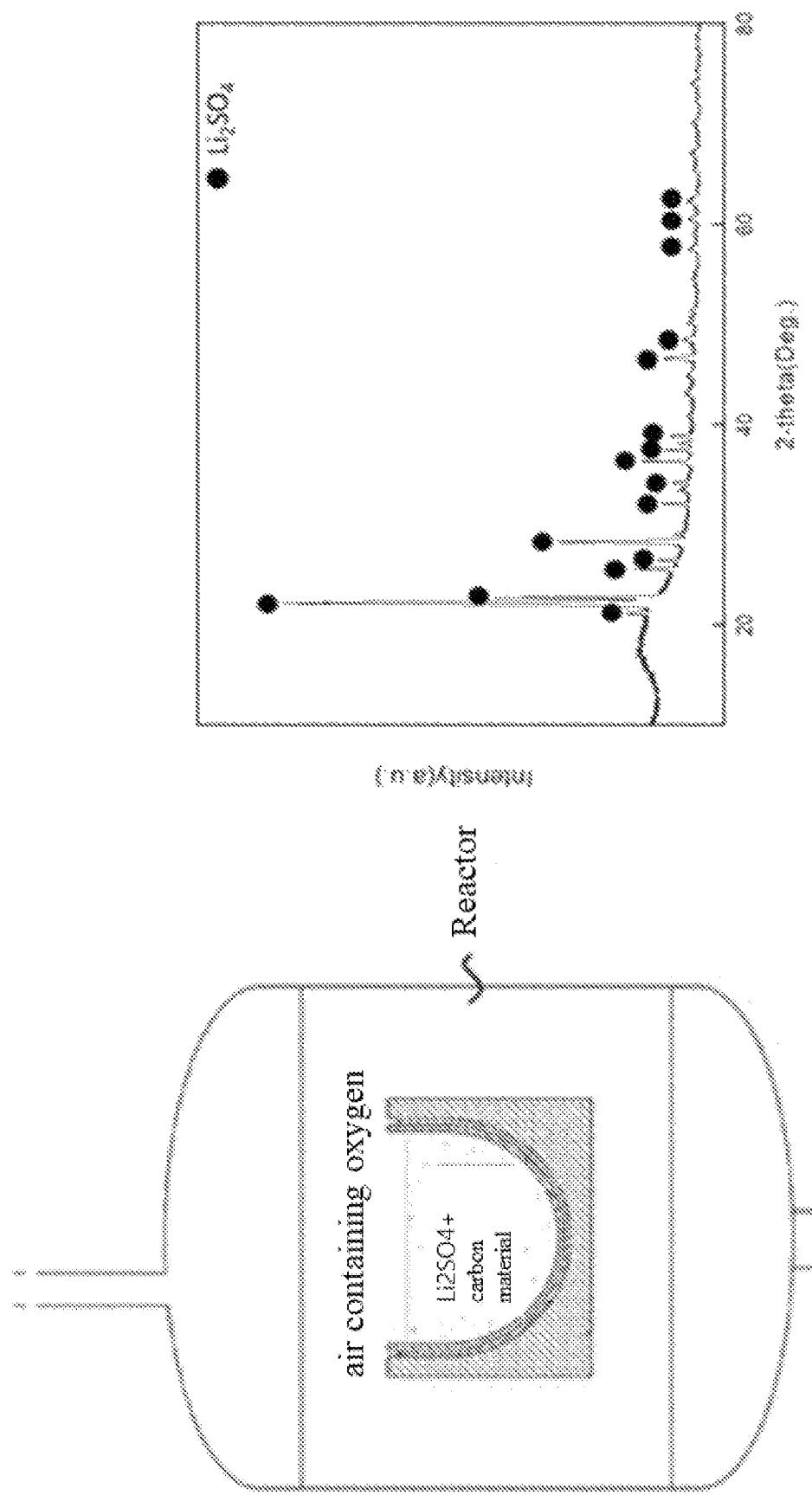
FIG. 7 is a schematic diagram and a XRD result of a reaction occurring when a mixture of lithium sulfate and carbon powders is heat-treated in air containing oxygen.

In this example, lithium sulfate and carbon powders were mixed with each other in a molar ratio of 1:2 and the heat-treatment thereof was conducted at 900° C. for 3 hours. FIG. 7 is a schematic diagram and a XRD result of a reaction occurring when a mixture of lithium sulfate and carbon powders is heat-treated in air containing oxygen.

As may be identified from the XRD result, only the peak of lithium sulfate appears but the lithium carbonate is not produced. Therefore, the conversion of lithium carbonate from lithium sulfate may occur only when conducting the heat treatment while injecting carbon dioxide or carbon monoxide into the reactor.

The present disclosure has been described with reference to the preferred embodiments of the present disclosure. Those skilled in the art will understand that the present disclosure may be variously modified and changed without departing from the spirit and scope of the present disclosure as described in the following claim.

What is claimed is:

1. A method for producing lithium carbonate from lithium sulfate, the method including heat-treating a mixture of lithium sulfate and carbon material under a carbon dioxide or carbon monoxide atmosphere, wherein the carbon material includes at least one selected from carbon powders, graphene, graphite, activated carbon, or carbon black.

2. The method of claim 1, wherein the heat-treatment is conducted under the carbon dioxide atmosphere.

3. The method of claim 1, wherein the heat-treatment is carried out under a dry condition.

4. The method of claim 1, wherein the heat-treatment is carried out at a temperature in a range of 800 to 1000° C.

5. The method of claim 1, wherein a concentration of carbon dioxide or carbon monoxide in the carbon dioxide or carbon monoxide atmosphere is maintained by injecting the carbon dioxide or carbon monoxide while the heat-treatment is being conducted.

6. The method of claim 5, wherein the carbon material is mixed with the lithium sulfate in a molar ratio of 1 or greater with respect to 1 mol of the lithium sulfate.

7. The method of claim 1, wherein the lithium sulfate is heat-treated in a range of 800 to 1000° C. under the carbon dioxide atmosphere of a dry condition.

* * * * *